(12) United States Patent
Neukirchen

(10) Patent No.: US 6,231,967 B1
(45) Date of Patent: May 15, 2001

(54) CORROSION RESISTANT BARRIERS

(75) Inventor: John D. Neukirchen, Kirkland, WA (US)

(73) Assignee: Polymer Ventures, L.L.C., Houston, TX (US)

( * ) Notice: Subject to any disclaimer, the term of this patent is extended or adjusted under 35 U.S.C. 154(b) by 0 days.

(21) Appl. No.: 08/834,288

(22) Filed: Apr. 15, 1997

(51) Int. Cl.⁷ .................. B32B 5/16; B05D 5/00
(52) U.S. Cl. .............. 428/332; 427/138; 428/468; 428/489; 428/543
(58) Field of Search .................. 428/332, 489, 428/457, 468, 543; 427/138

(56) References Cited

U.S. PATENT DOCUMENTS

| | | | |
|---|---|---|---|
| 3,610,291 | * | 10/1971 | Heslop et al. ................ 174/127 |
| 3,868,265 | * | 2/1975 | Sakai et al. .................. 117/18 |
| 3,967,020 | * | 6/1976 | Uemura et al. ............... 428/36 |
| 4,004,619 | * | 1/1977 | Eddlemon et al. ............. 141/11 |
| 4,455,204 | * | 6/1984 | Pieslak et al. ............... 204/147 |
| 4,500,577 | * | 2/1985 | Satake et al. ................ 428/36 |
| 4,781,988 | * | 11/1988 | Rusek et al. ................. 428/450 |
| 4,937,027 | * | 6/1990 | Oshio et al. ................. 264/133 |
| 4,983,426 | * | 1/1991 | Jordan ....................... 427/407 |
| 5,026,448 | * | 6/1991 | Reafler et al. ............... 156/212 |
| 5,026,451 | * | 6/1991 | Trzecieski et al. ............ 156/244.27 |
| 5,085,896 | * | 2/1992 | Marks et al. ................. 427/412.1 |
| 5,268,215 | * | 12/1993 | Krenceski et al. ............. 428/213 |
| 5,286,528 | * | 2/1994 | Reafler ...................... 427/412.1 |
| 5,714,093 | * | 2/1998 | Heimann et al. ............... 252/389.62 |
| 5,786,053 | * | 7/1998 | Andrenacci et al. ............ 428/36.9 |
| 5,792,518 | * | 8/1998 | Gibson et al. ................ 427/447 |
| 5,929,144 | * | 7/1999 | Fields ....................... 524/62 |
| 6,033,147 | * | 3/2000 | Richter ...................... 404/79 |

* cited by examiner

*Primary Examiner*—H. Thi Le
(74) *Attorney, Agent, or Firm*—James R. Vance

(57) ABSTRACT

Saltwater, waste water, atmospheric and other corrosion resistant barrier apparatus and radioactive contamination containment barrier apparatus that are applied to a substrate, such as to metal, steel, concrete, rock, stone, ceramic material, tile, and the like, and methods for manufacturing the same. The apparatus generally having an asphaltic mastic basecoat and a thermoplastic topcoat which is at least partially melted and integrated into the mastic basecoat. Alternatively, the apparatus further having a solvent primer which is applied to the substrate prior to the application of the mastic basecoat.

24 Claims, 3 Drawing Sheets

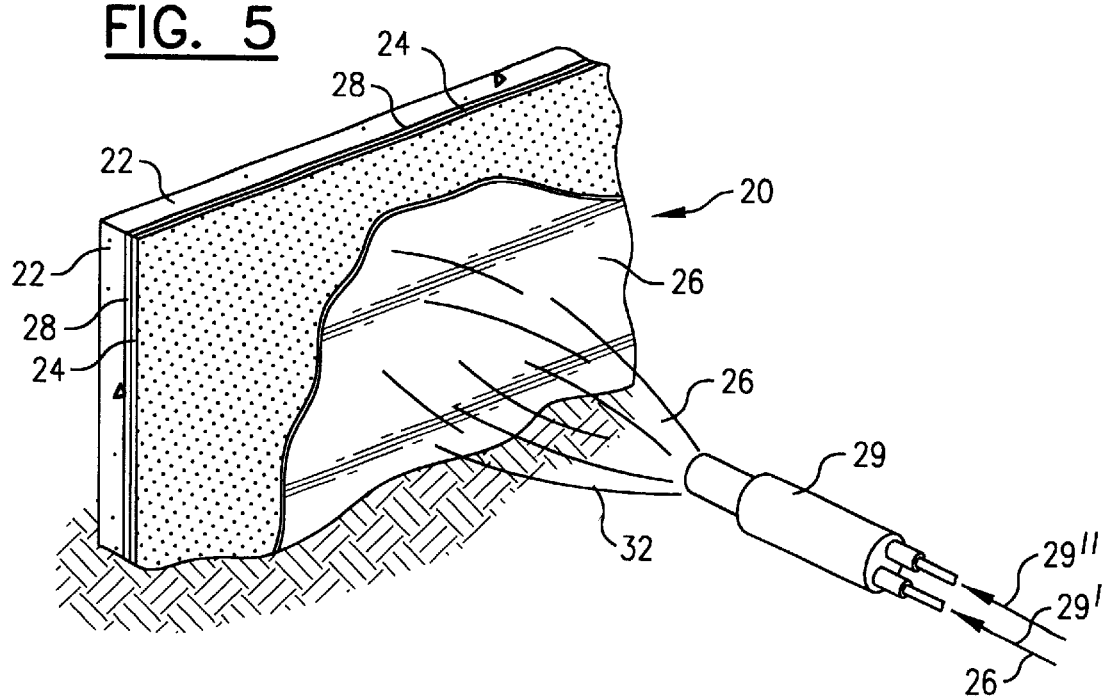
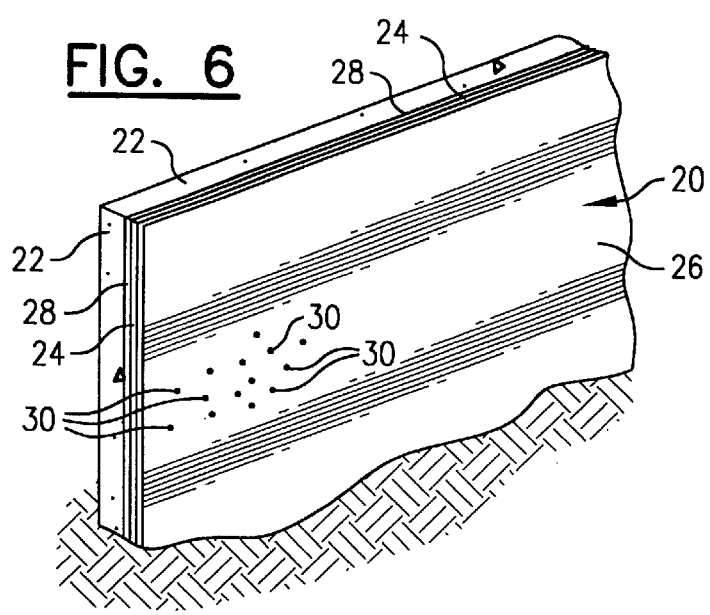

CORROSION RESISTANT BARRIERS

COPYRIGHT NOTICE

© Copyright 1997, James R. Vance. All Rights Reserved.

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyrights whatsoever.

TECHNICAL FIELD

This invention relates to saltwater, waste water, atmospheric and other corrosion resistant coatings or barriers and to radioactive contamination containment coatings or barriers that are applied to a substrate surface such as to metal, steel, concrete, rock, stone, ceramic material, tile, and the like.

BACKGROUND ART

A common problem throughout many industries is exposure of extremely valuable and costly structures and equipment to corrosive, toxic and/or abrasive elements. For example, the sewer line industry is currently faced with repairing, restoring and/or replacing thousands of miles of public and private sewer lines. The City of Seattle has recently allocated in excess of seventeen million dollars ($17,000,000.00) for the year of 1997 to restore damaged sewer lines within its jurisdiction.

Such damaged sewer lines are primarily manufactured from concrete.

In the case of sewer lines, hydrogen sulfide gasses out above the sewage line of the contained sewage. Hydrogen sulfide is very corrosive. Over a period of time, the hydrogen sulfide eats at and corrodes away the concrete to a point that a maintenance crew must excavate the sewer line, and clean, repair, restore and/or replace it.

As found within sewer lines, many corrosive, toxic and abrasive problems appear to concentrate slightly below and/or above the water line.

Within the marine industry, piers, seawalls, floating bridges, bridge pilings, retaining walls, wave breakers, boats, ships, barges, and related equipment are regularly exposed to tide fluctuations, wave splash, electrochemical disintegration, and a host of other corrosive, toxic and abrasive problems. Again, these problems are located primarily at or above the water line.

The United States government, and particularly the Coast Guard and Navy, are currently faced with a large number of steel seawall structures that require immediate repair. Metal placed below the water line can be easily treated and protected using an electrified cathode. This type of corrosion treatment below the water line is known as cathodic protection. Basically, cathodic protection uses a sacrificial anode or an impress current system to stop rust on an ionic or on a molecular level. Since water is an electrolyte, electrical currents are easily dealt with below the water line. In other words, as long as there is water, the structure below the water line can be very easily protected electrically through use of a cathode.

Significant problems arise, however, within the atmospheric and splash zone area of the structure. It is very difficult to prevent corrosion within the atmospheric and splash zone area of a structure. The causes or effects of atmospheric corrosion are many. For example, a steel structure is exposed to water and air, and continually passes through a wet and dry cycle. In an oceanic or saltwater environment, chloride, chlorine, and/or salt is repeatedly splashed onto the structure. Once salt splashes onto the structure corrosion begins. The old salt is then washed off and fresh salt is splashed onto the structure. This is the common corrosion effect or problem that oceanic structures are continually facing.

In the past, steps were generally taken to protect concrete sewer lines and steel seawall structures against such corrosive, toxic and abrasive forces. For example, over the past fifteen (15) to thirty-five (35) years, many of such structures were coated with coaltar epoxy, polyamide epoxy, or urethane in an effort to stop decay. The nearly universal failure of such coatings has caused the current need to repair these structures.

Another factor that breaks down the heretofore used anti-corrosion protective systems is the effects of ultraviolet (UV) radiation upon the exposed structures and/or protective barriers. Ultraviolet radiation of the sun causes a chemical breakdown and deterioration within the protective barrier.

The cost of repairing damaged surfaces and structures can be extremely high. For example, relining sewer lines with the same antiquated materials and application procedures costs about $30.00 to $35.00 for each square foot of repair. The repair is accomplished by excavating the broken or corroded sewer line, trowel applying a tar mastic to the damaged section of line, and then hand applying and wrapping a liner around the sewer line over the tar mastic.

The cost to repair damaged seawall structures within the marine industry, using similar antiquated materials and application procedures, is currently about $30.00 for each square foot of repair.

Such repair procedures require the implementation of a large number of highly labor-intensive steps or procedures in order to get the tar mastic to stick or adhere to the sewer lines or other substrate surface.

Please keep in mind that the sewer line or other failing substrate structure has been exposed to corrosive, toxic and/or abrasive elements for years, if not decades, of use. As a consequence, the substrate structure itself is usually failing or decomposing. In addition, there may be a substantial amount of debris, such as soil, dirt, mud, clay, gravel, sewage, grime, salt, organic material, radioactive material, old coatings, and the like, that are still clinging to the sides of the substrate.

In order to properly prepare the substrate surface, the substrate must be: excavated; brushed, swept or chemically scoured; and subjected to one or more jets of pressurized air and/or water, or abrasive media at very elevated pressures. The substrate must then be allowed to dry before the tar mastic is applied.

For the tar mastic to provide any protection whatsoever, it must be applied with a substantial thickness and be relatively stable after it is applied. In other words, if the tar mastic is too thin, it will be easily applied. However, thin applications of tar mastic will not be sufficiently thick to provide the desired protection. Furthermore, thin coats of tar mastic may run off of the surface being coated, thereby thwarting repair efforts.

Conversely, if the tar mastic is too thick, it is very difficult to apply and use. Thick coats of applied tar mastic do not adhere well to the substrate, which again thwarts the purpose of the repair.

In order to obtain an acceptable compromise between these two extreme conditions, solvents are usually stirred or mixed into the tar mastic. The solvent makes the tar mastic thinner, more viscous, and easier to trowel or hand apply. For example, a toluene solvent of about fifty percent (50%) by volume may be mixed into a polyisobutylene-type of mastic.

In other words, a thick tar mastic can be thinned down using a solvent that over time will evaporate out. The thinner liquid is then coated onto the substrate surface. If the tar mastic is thinned down sufficiently, it may permeate into the surface of the substrate. The solvent then evaporates out and leaves a more solidified mastic behind.

Once applied, the thinned-out, solvent-laden tar mastic must be allowed to cure. In essence the solvent is permitted to evaporate out into the atmosphere, leaving behind a more viscous, slightly tougher tar mastic on the substrate surface. The solvent is intended to carry the tar mastic into the pores of the substrate surface. The solvent then evaporates out, leaving the tar mastic on the surface.

This curing procedure requires a significant amount of time. During the curing time, the work crew cannot perform any other functions at that location, and the structure cannot be used. Such delays can be very costly and expensive. Furthermore, tidal flows and other time sensitive conditions may not permit the use of long curing times.

The above described procedures face another significant problem. Due to public concern over the environment, governmental regulations and laws have become extremely strict. Such regulations and laws often govern how a procedure is to be performed. For example, there are very strict regulations and rules as to what is considered a contaminant. The debris which is scraped, sprayed and washed off of the substrate surface may very well comprise subject contaminants. Furthermore, the solvents used to thin down the tar mastic are also likely subject contaminants. Many of these regulations and laws state basically that no contaminants can enter into the environment. Therefore, it is important to obtain a one-hundred percent (100%) collection rate of all such contaminants. Failure to conform to such regulations and laws can expose the repair company and/or municipality to severe fines and political fallout.

Heretofore, it was very expensive and difficult, if not impossible, to obtain a one-hundred percent (%100) contaminant collection rate when such aforementioned procedures are used on huge seawalls that are located in non-static environments, i.e., within tidal and/or wave zones.

Industries that repair such structures are very much entrenched in the foregoing procedures. The primary reason for this entrenchment is the lack of adequate alternative procedures.

There are unrelated coating systems that are used in very different environments than those discussed above. For example, clean metals such as aluminum can be anodized. However, even if it could be done, no one in their right mind would want to anodize a contaminated, corroded concrete sewer line. Similarly, by investing great expense, exercising rigorous and time consuming metal preparation procedures, and placing the metal within a controlled environment, such metal can be thoroughly cleaned. The status quo within current coating technology is that the substrate must be completely clean. In order to provide long-term performance, the substrate surface or profile is mechanically sandblasted to remove all contamination therefrom.

Once properly cleaned, the metal can then be heated to elevated temperatures and a spray of molten thermoplastic may be directed toward the hot metal to place a coat of thermoplastic thereupon. However, unless the metal is extremely clean and the proper temperatures maintained throughout the process, the thermoplastic will not adhere to the metal and will simply peel off. Due to the difficulties associated with applying this form of coating, such coating systems necessarily have very limited warranties. Furthermore, such coating systems have a very small range of application.

The inventor believes that the above-listed information, whether taken alone or in combination, neither anticipate nor render obvious the present invention. The foregoing explanation does not constitute an admission that such information is relevant or material to the claims of this patent document.

DISCLOSURE OF INVENTION

Prior to describing the present invention, the inventor desires to reiterate some of the problems this invention is intended to overcome.

Existing, in situ concrete and steel surfaces are frequently exposed to active corrosive and erosive environments. When rehabilitating and protecting such surfaces against corrosion and erosion, several important issues must be addressed. These issues are generally defined by the significant areas of difficulty previously faced.

Initially, an important distinction must be made between coating systems applied to newly manufactured, clean surfaces and restorative coating systems that are field applied to in situ structures. The former systems cannot be used in field application. Many of the later systems, however, may be applied on either new construction and/or on previous construction that needs to be repaired.

Most if not all of the heretofore known long term corrosion resistant coating systems, however, are primarily designed to be installed in a controlled shop environment. For example, standard thermoset materials that are intended for use in a chemically active environment require a complete cure prior to placement into active service.

During use, surfaces and structures that are subjected to chemically active and/or corrosive environments are attacked on both a massive level and a microscopic level in a much more severe manner than when simply exposed to inclement weather. Once placed in the field, protective thermoset coatings are subjected to changing temperatures, humidity, surface deterioration, abrasion, ultraviolet radiation, acid rain, and other adverse elements. Exposure to such elements prior to obtaining a complete cure of the protective coating will greatly and adversely effect the performance of the coating.

Over a period of time, caustic acid which exceeds the thermoset coating's capacity to withstand may also cause the coating to fail. Other causes for failure are repeated freezing and thawing or thermocycling between hot and cold. In essence the thermal coefficient of expansion and contraction embrittles and destroys the thermoset coating. The differential of coefficient of expansion and contraction, meaning the substrate comprises a separate and different material than the overlying coating. Basically, the thermoset coating is expanding, contracting and moving on its own, at a different rate than the underlying substrate. Over a period of time, the substrate and thermoset coating become incompatible, and the thermoset coating cracks off.

Repairs on such steel and concrete structures, such as on bridges and highrise buildings, can be of a critical nature. Many steel structures are at risk due to such corrosion and failure of the previously applied thermoset coating.

One of the important features of the present invention is its ability to be applied to a wide variety of different substrate structures that need only minimal preparation.

Some examples of active and/or corrosive environments for which this invention will be beneficial, include but are not limited to: saltwater and freshwater marine structures, off-shore structures, waste water transmission and purification systems, chemical containment facilities, radioactive contamination containment barriers, and the like. Of course there are a host of other applications and potential applications for this invention, depending upon the needs of any particular situation.

The present invention may also be used in situations that require protection of environmentally sensitive areas, such as protecting structures that are adjacent to pristine waterways and protected habitats.

National and international environmental concerns and laws now regulate the use, removal and disposal of hazardous materials. Chemically active and corrosive environmental situations require an enhanced concern and caution for the use, removal and disposal of such contaminants. For example, many manufactures are now required to reformulate the chemicals used in the manufacturing process, and/or coat their storage facilities and products.

Such laws have also directly impacted the long term performance and corrosion resistance capabilities of most heretofore field applied coatings by limiting and/or eliminating many ingredients that were therefrom thought to be essential for proper performance of the coating product.

Heretofore, most field applied coating systems could only be installed onto a clean, sandblasted surface in order to obtain adequate adhesion and an acceptable term of service.

To date, alternative specially-formulated materials, that permit field application, have provided very poor performance and had excessive cost in manufacture and application. Consequently, such specially formulated materials have proven useful for only minor or special repairs.

It is the inventor's experience that the new environmental laws that mandate site containment and collection have doubled, if not tripled, the cost of installing protective coatings. This increase in cost has rendered such heretofore used technologies generally unavailable for most desperately needed applications.

Use of mechanically fastened plastic sheeting as a protective coating has suffered from even greater difficulties and failure than the difficulties mentioned above.

The attention of the reader will now be directed to the apparatus and processes or methods of the present invention.

The present invention can be used to manufacture a wide variety of differently formulated corrosion resistant barriers to accommodate nearly any desired application.

The present invention increases the speed and simplifies the procedure to manufacture, apply and repair corrosion resistant barriers.

The present invention resists chemical penetration, prevents rust and corrosion, and is impact absorbing.

The present invention also imparts sound dampening to the substrate structure thus coated.

The topcoat of the present invention may be provided in any number of several different colors.

The present invention generally eliminates, or at least greatly minimizes, the need to: (a) conduct intense site preparation and cleaning procedures; (b) thin a tar mastic material with solvent in order to make the tar mastic workable; (c) gather contaminants used on and removed from the substrate during the cleaning procedures; (d) manually trowel the barrier material onto the substrate; (e) preheat the substrate prior to application of the barrier materials; and (f) schedule long delay periods in order for the solvents to evaporate from the barrier, as would otherwise be required to apply the barrier to the substrate surface.

The rate of application of the barrier to the substrate is greatly increased.

The present invention will also significantly decrease the amount of time that would otherwise be required to prepare and protect such substrate surfaces.

The numerous benefits of this invention combine to dramatically reduce the overall cost to protect a substrate than heretofore was thought possible. The apparatus and procedures of the present invention are significantly less expensive and more economical to use and apply than the systems mentioned in the previous section of this disclosure.

Corrosion resistant barriers manufactured using the present invention are also more easily constructed and repaired than systems heretofore known.

The present invention provides an uncomplicated but very effective apparatus and process or procedure to create a corrosion resistant barrier using a relatively small number of appliances or machines, and within the preferred embodiment eliminates the need for hand troweling. For example, the present invention can be practiced by using primarily three different machines: (a) a power washer; (b) an asphaltic-mastic, thermoplastic sprayer or spreader; and (c) a thermoplastic molten spreader and/or flame-sprayer. Each of the listed machines are readily available in the marketplace and do not necessarily require significant alteration thereto to accomplish the purposes taught herein.

Since a thermoplastic flame-sprayer can be used, there would be no need to maintain a reservoir of molten barrier material on hand for use. This greatly reduces danger during transport and use of such machinery.

Alternatively, the thermoplastic material may be melted into a molten state within a kettle and then sprayed onto the mastic basecoat.

When performing each process described herein, all applicable safety precautions should be exercised. For example, face shields, gloves, life jackets (if necessary), protective clothing should be worn. Adequately inspected fire extinguishers should be readily at hand.

Only a minimum amount of manipulation, physical dexterity, skill, knowledge and effort is required to manufacture the rigid and/or semi-rigid, stable and structurally sound corrosion resistant barrier of the present invention. In particular, the machinery is extremely simple to use once the principles of operation and the teachings of the present invention are understood.

The apparatus of present invention has been specifically designed to have internal structural integrity and stability, shock absorption, longevity, durability and abrasion resistance, whether positioned above or below the water line.

The apparatus of the present invention can be easily modified as needed by altering the percentages by volume of the materials used therein. Such modifications can be accomplished with only a minimum amount of delay or difficulty.

The present invention is simple, compact, unobtrusive, efficient, reliable, reusable and rugged. The invention is easily constructed, and is inexpensive and economical to manufacture.

The present invention provides an relatively aesthetically pleasing result and is easily used, cleaned and repaired.

Due to the extreme adhesive bond obtained by this invention and the elevated ability for corrosion resistance, the confidence level of those who apply and use the invention should be significantly increased over use of the systems heretofore used and their associated, proven failure levels.

In addition to the foregoing advantages, and other advantages described further below, the present invention also overcomes all of the previously mentioned the disadvantages.

To achieve the foregoing general and specific objectives, in its most basic form, the apparatus of the present invention generally comprises two specifically, specially formulated materials that when used in conjunction with each other form a very uniquely and effective corrosion resistant barrier. Such apparatus is particularly well suited for application in the field to existing, in situ concrete and to steel substrate surfaces that have previously corroded and now require repair.

The invention basically utilizes two separate thermoplastic polymers, namely a mastic material or basecoat and an overlying thermoplastic material or topcoat. For example, the mastic basecoat may comprise a polymer-modified, asphaltic mastic. The topcoat may comprise a flame-sprayed thermoplastic material and/or a molten sprayed thermoplastic material.

Please note that the terms "overlying", "underlying", "on top of", "beneath", "over", "under", and other similar position identifying language relate only to the successive layers of such materials and the substrate, and should not be interpreted as limitations relative to horizontal or vertical.

Within the preferred embodiment of the invention, the asphaltic-mastic basecoat and thermoplastic topcoat are heated and progressively applied in a molten state onto a substrate surface. Thus applied, such materials aggressively bond to one another and to the underlying substrate surface. Furthermore, the basecoat and topcoat generally encapsulate and/or protect the substrate surface.

The first material, mastic or basecoat generally comprises a single component of polymer modified thermoplastic. For example, the basecoat may comprise an asphaltic mastic which is applied to the substrate.

When heated to an application temperature of about 350 to 500 degrees Fahrenheit, the mastic basecoat changes to a semi-fluid state and when applied to the substrate surface has very aggressive adhesive and sealing characteristics. Upon application, the heated basecoat aggressively "wets-out", adheres to, binds to, and seals the contacted surface of the substrate. When cooled, the mastic basecoat forms a tough, stable, elastomeric layer of sealant that has excellent environmental resistance properties.

More particularly, within the preferred embodiment of the invention, the mastic basecoat is heated within a modified kettle pump. The kettle pump is similar to the high performance roofing kettle transfer pumps that are used to melt tar for spraying onto a rooftop. The modified kettle pump heats the mastic basecoat to a hot temperature to spray the material in a uniform and controllable fashion. The kettle pump is also modified by using a specially designed hose and spraying wand or gun that safely controls and applies the heated mastic basecoat material.

The mastic basecoat is preferably heated within the kettle/spray unit to approximately or about 380 degrees Fahrenheit prior to application.

When properly heated, the molten mastic basecoat is then pumped from the kettle pump, through the hose and spraying wand or gun, onto the substrate surface. The spray of mastic basecoat is generally applied in a single application at an approximate rate of fifteen (15) square feet per gallon. This will result in a wetted film thickness of about 70 to 80 mils.

In most cases, the application of the molten mastic basecoat should be in a generally uniform layer on the substrate surface. However, if needed, successive layers of the basecoat can be applied to the substrate to build up a low spot in the surface, or to accomplish other desired purposes.

Special attention should be given to the interlocks to ensure that a consistent application of the mastic basecoat has been introduced or applied into deeper surfaces and/or crevices within the substrate.

Please note that within this preferred embodiment of the invention, the mastic basecoat is applied in a melted or molten state.

Alternatively, or in addition thereto, a low volume propane torch may be used to apply heat to the basecoat until the surface becomes semi-fluid. The surface of the mastic basecoat can then be quickly brushed or flattened using a trowel until a smooth finish is achieved. It is important, however, to not use excessive flame when the mastic basecoat is heated.

The mastic basecoat may be formulated to have any number of several specifically desired installation performance properties.

Once applied, the mastic basecoat quickly cools to form an important layer of this invention's solidified, high-performance, anti-corrosion barrier. When applied, the fluid and inherent adhesive properties of the molten mastic basecoat tend to permeate and penetrate into, and firmly bind to, the underlying substrate surface. Consequently, the uniquely aggressive nature of the mastic basecoat, produces a surprisingly strong adhesion to the substrate surface and an enhanced, unexpected overall long term performance.

These characteristics beneficially combine to make the molten mastic basecoat less dependent upon surface cleanliness. In fact, a key selling point of the present invention is its ability to be installed over a minimally prepared substrate surface.

In many situations, the removal of contamination and loose and deteriorated matter may be all that is required to prepare the substrate surface for application of this invention. Tightly adhering materials, such as old coatings, can be allowed to remain and the molten mastic basecoat applied directly thereto.

Although surface preparation is considered within this industry to be one of the most critical phases of installation, if this invention is used, sandblasting to obtain extremely clean metal substrate surfaces is no longer an absolute requirement.

Notwithstanding the preceding sentence, if desired, the substrate surface may be sandblasted prior to application of the mastic basecoat. Alternatively, any other method of surface preparation may be used, particularly those referenced by the Steel Structures Painting Council as: (a) SSPC-SP3 Power Tool Cleaning; (b) SSPC-SP2 Hand Tool Cleaning; and/or (c) high pressure water washing followed by either power tool or hand tool cleaning, such as a SP3 or SP2 cleaning. In essence, the extent of substrate surface preparation is determined on an individual project basis.

If needed a surface abrader or scraper can be used to smooth extremely rough surfaces. Furthermore, pitted or heavily corroded surfaces may require additional attention during preparation of the substrate to ensure and acceptable surface for proper adhesion.

Marine growth should be removed. Similarly, oils and greases should be removed from the substrate surface. Loose and unsound matter should also be removed from the substrate surface. Old coatings may remain on the substrate as long as such is tightly adhered.

Sharp edges and unnecessary protrusions that may exist on the substrate surface, including splice plates, reinforcing clips, and the like, should be removed before applying the basecoat and topcoat of this invention.

If possible, the substrate surface may also be washed with an approved diluted biodegradable detergent cleaner. Such cleaner should be permitted to stay on the surface for approximately one (1) minute before it is rinsed off with potable water.

Fabric, grout, cement, or other forms of materials can be used to reinforce damaged areas of the substrate prior to application of the mastic basecoat and topcoat.

The mastic basecoat may be applied to any desired thickness. However, within the preferred embodiment of the invention, the mastic basecoat is applied to a thickness of about 70 to 80 mils. If the need required, a lightly sprayed basecoat could be thinner.

For example, the basecoat preferably comprises a polymer-modified, thermoplastic resin mastic sold under the trademark or trade name of CRAFCO 561, sold by Crafco Incorporated.

It is important to prevent the mastic basecoat from becoming contaminated before the thermoplastic topcoat is applied. If the protective mastic basecoat becomes contaminated with oil, and/or grease, or is subjected to a tidal cycle before the thermoplastic topcoat can be applied, the mastic basecoat should be cleaned as required by solvent wiping or detergent washing, and then water rinsed. The outer surface of the mastic basecoat should then be heated and brushed to expose a fresh surface thereon.

The second material or topcoat generally comprises a polymer modified thermoplastic which initially has a dry pelletized and/or powdered state. The topcoat is preferably flame-sprayed under pressure onto the mastic basecoat.

Within the preferred embodiment of the invention, the thermoplastic topcoat comprises product sold under the trademark or trade name PFS 113, sold by PFS Thermoplastic Powder Coating, Inc. A plastic, polyethylene, polyurethane, and/or copolymer derivative resin may also be used.

A generally uniform stream of thermoplastic powder is blown through a spray unit under an elevated air pressure in excess of one Atmosphere. The thermoplastic powder then passes through a controlled propane generated flame, whereupon it is converted into a melted or molten state. By design, the plastic powder is melted within the flame and due to its inertia and associated air pressure is delivered onto and at least partially into the mastic basecoat in a molten state.

The following is a very important feature of the present invention. Due to the similar thermoplastic properties of the mastic basecoat and the topcoat, an immediate, intimate and integral bond between the basecoat and the topcoat are formed. In essence, the thermoplastic topcoat and mastic basecoat at least partially merge together to make an integral connection or composition of the two materials. Once these materials are cooled, they bond together and are inseparable.

The thermoplastic powder may comprise one or more of several different high performance base resins. The two primary resins that can be used for the topcoat are ethylene methyl acrylic acid copolymer (EMAA) and/or a hybrid version of the EMAA known as an ionomer. Both of these materials are formulated to provide excellent properties of ultraviolet (UV) protection, chemical resistance, abrasion resistance, and strong physical integrity. The hybrid version is primarily used when enhanced abrasion resistance is required.

The thermoplastic topcoat is preferably flame-spray applied at an approximate rate of about five (5) square feet per pound of pelletized, granulated and/or powdered thermoplastic material. This application rate yields an thickness of about 20 mils. The flame-sprayed thermoplastic topcoat is preferably applied as a uniform film having a general thickness of about 10 to 30 mils. Of course, repeated applications could be used to make the topcoat as thick as desired. Furthermore, a lightly sprayed topcoat could be thinner if the need required.

The thermoplastic topcoat is best applied in two (2) separate but continuous 10 mil thickness application coats. The molten surface is permitted to at least partially cool between coats.

It is preferably that the mastic basecoat, and mastic primer, if one is used, be not allowed to sag during application of the thermoplastic topcoat. This can be controlled by the careful application of heat during the process.

It is also preferable that some form of wind screen or other protection is provided for the topcoat when it is applied during very windy conditions.

Similar to the mastic basecoat, once the topcoat cools, it solidifies to form a tough, flexible, and cohesively strong membrane and barrier.

Since both the mastic basecoat and the topcoat comprise thermoplastic materials, no cure time is required prior to immersion. However, the molten material should be permitted to cool prior to immersion. The present invention requires approximately twenty (20) to forty (40) minutes to cool before the apparatus could be subjected to abrasion.

As a side note, many golf balls are manufactured with a topcoat containing many of the same elements as the topcoat of the present invention. One can therefore appreciate the durability and resiliency of using this same or similar type of material for the topcoat for the present invention.

By definition, thermoplastic means plastic that has the ability to melt and remelt under the influence of heat and/or pressure. This is one of the important features that separates thermoplastics from traditional catalyzed coatings, thermosets, and even less traditional materials like powder coatings, and the like.

Non-thermoplastics are generally categorized as thermoset plastics. Thermoset means that once the plastic is applied and begins to cure, the polymers cross-link or set. This causes an irreversible change in the plastic material. For this reason, thermoset plastics are very difficult to repair.

In stark contrast to thermoset plastics, the topcoat of the present invention is manufactured from a thermoplastic resin that is easily remelted and thereby repaired. The heat and pressure generated during a repair application remelts the previously applied, existing thermoplastic surface. Such remelting of the thermoplastic permits the molten repair material to make an immediate, intimate and integral bond with the previously laid material. If the molten repair material is applied within the recommended time frame, the thermoplastic bond between successive applications of topcoats is near equal to the bond that takes place between the initially applied topcoat and the mastic basecoat.

Thus bonded together, the mastic basecoat and the topcoat combine their unique thermoplastic characteristics to form a very effective corrosion protection barrier and coating. The mastic basecoat and the over-applied topcoat each have specific performance properties that perform separate and important functions.

The advanced adhesion of the mastic basecoat provides an extremely stable anticorrosive foundation and sealant for the topcoat. Without the mastic basecoat, the topcoat could only be applied to extremely clean substrate that has been preheated and treated within a controlled environment.

The topcoat forms an intimate and integral bonded layer of high performance plastic over the mastic basecoat. The topcoat has performance properties that protect the basecoat from mechanical, chemical and ultraviolet (UV) attack.

The composite combination of the mastic basecoat and the overlying topcoat combine the advantages and benefits of each, including but not limited to flexibility, elasticity and long term stability. Such a combination of materials, using the processes as taught herein, offers truly superior advantages over other coatings heretofore used for corrosion protection.

Within an alternative embodiment of the present invention, the mastic basecoat is trowel applied to the substrate. Then, the topcoat is heated and progressively applied in a molten state onto the mastic basecoat.

Within a further alternative embodiment of the present invention, an optional layer of mastic primer may be first applied to the substrate surface before application of the mastic basecoat. Thereafter, the mastic basecoat and the topcoat are applied thereto.

For example, an application of mastic primer to a thickness of about 5 to 8 mils may be applied to the substrate surface. It is preferable that the mastic primer be applied to a preheated substrate surface while it is still warm and above the specific dew point of the material.

Although not absolutely required in all circumstances, the substrate surface could be preheated to a hand warm condition of about 120 degree Fahrenheit with use of an approved propane torch. Preheating the substrate surface assists in "wet-out" and improves the bond of either the mastic primer and/or the mastic basecoat to the substrate surface. Such preheating also assists in removing any moisture that might exist on the substrate surface. A wire brush may be used to remove any surface dusting or lifting that may be caused by the preheating process.

If a mastic primer is used, the mastic primer should be permitted to "wet-out" on the substrate surface for several minutes before any further steps are performed. Thereafter, using a low volume propane torch, a blast of heat but not flame can be uniformly directed and applied at or to the coated substrate surface. In a very short period of time, the mastic primer will become very tacky and will no longer appear to be wet. Rather the mastic primer will appear to be mastic and sticky. At this step in the procedure, it is important not to overheat the mastic primer or to char or to cause bubbles to appear therein.

It is important to prevent the mastic primer from becoming contaminated before the mastic basecoat is applied. If the protective mastic primer becomes contaminated with oil, and/or grease, or is subjected to a tidal cycle before the mastic basecoat can be applied, the mastic primer should be cleaned as required by solvent wiping or detergent washing, and then water rinsed. The outer surface of the mastic primer should then be heated and brushed to expose a fresh surface thereon.

As with the mastic basecoat and topcoat, each successive spray or application of the mastic primer should be made in an overlapping or interlocking manner to assure full coverage of the applicable area.

When repairing a previously laid application of the invention, or when continuing the application process after a long delay such as at the beginning of a work period, the previously laid surfaces should be heated into a melt condition. Thereafter, the surfaces may be brushed or troweled to expose a fresh surface to which more material will be applied.

Within a further embodiment of the present invention, additional abrasion resistant material may be pressed, rolled and/or sprayed into the hot and/or molten topcoat. For example, if additional abrasion resistance is needed, beads, metal shavings, pellets, shot, glass, aggregate, granite, gravel, sand, or any other desired material may be applied to the topcoat.

The preferred and several different, alternative embodiments of the apparatus and associated structures of the present invention and the processes for manufacture and use thereof are further described in greater detail in the following description, claims, Abstract and drawings of this Specification. However, to avoid any possible confusion as to the scope of the present invention, each of the following sections, claim language and the drawings of this Specification in their entirety are incorporated herein by this reference.

The foregoing and other objectives and advantages of the present invention will become more readily apparent upon reading the following disclosure and referring to the attached drawings.

BRIEF DESCRIPTION OF DRAWINGS

FIG. 5 is a partial, perspective, schematic view of a thermoplastic topcoat being applied to the mastic basecoat as taught herein.

FIG. 6 is a partial, perspective, schematic view of the apparatus of the present invention applied to a substrate surface.

One should understand that the drawings are not necessarily to scale and the elements are sometimes illustrated by graphic symbols, phantom lines, diagrammatic representations and fragmentary views. In certain instances, the inventor may have omitted details which are not necessary for an understanding of the present invention or which render other details difficult to perceive.

BEST MODE FOR CARRYING OUT THE INVENTION

Referring to the attached drawings, wherein like numerals indicate like parts, the present invention generally comprises an apparatus 20 for shielding and protecting a substrate 22 of non-flammable material from corrosion and abrasion. For example, the protected substrate 22 may comprise a surface or structure of metal, steel, concrete, rock, stone, ceramic, tile, or any other generally nonflammable material.

Figure 1:
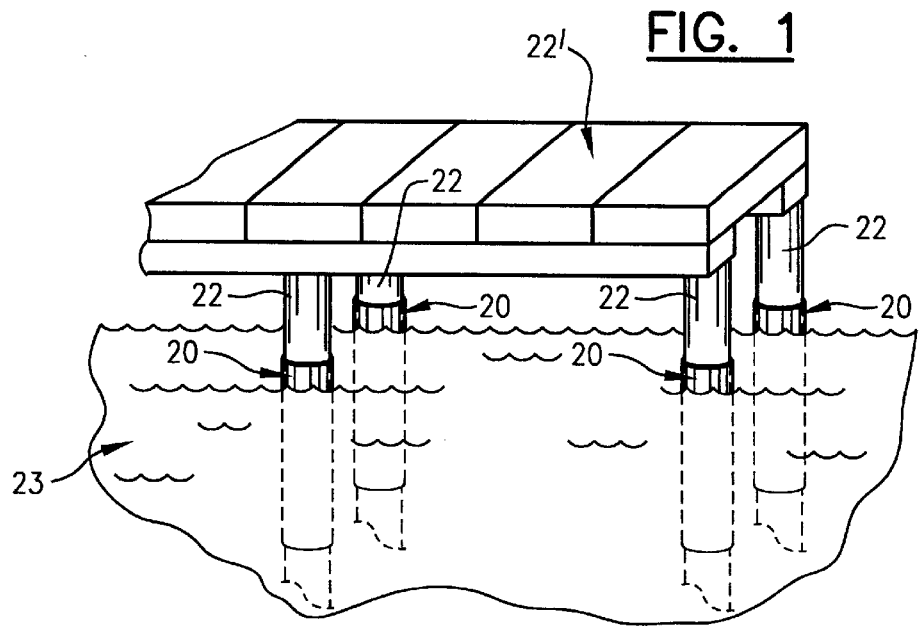
FIG. 1 is a partial, perspective, schematic view of an apparatus of the present invention in accordance with the teachings of this disclosure. Such apparatus is applied to pier pylons, piles, pilings or pillars that are positioned within tidal waters. Please further note that such apparatus would preferably be applied during an extreme low tide and will protect the pylons from corrosive and abrasive effects of the water throughout the height range of the tidewater.

FIG. 1 illustrates the apparatus 20 applied to a substrate 22 which defines a plurality of pilings of a dock 22'. The piling substrate 22 is exposed to a corrosive environment, such as to seawater 23.

Figure 2:
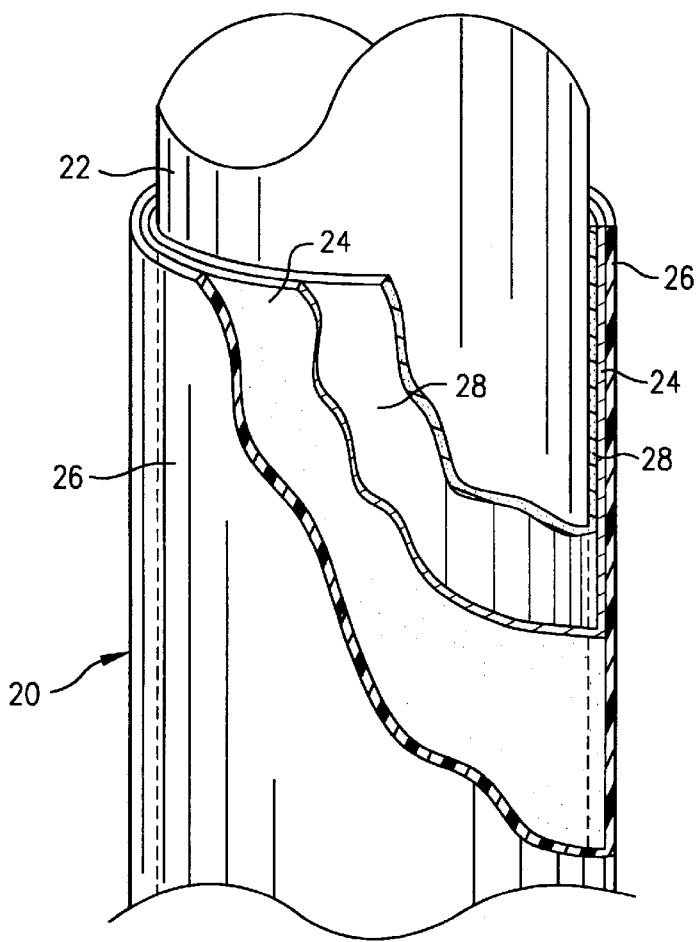
FIG. 2 is a partial, cross-sectional, layered, perspective view of the apparatus shown within FIG. 1.

Referring to FIG. 2, the apparatus 20 of this invention generally comprises the combination of: (a) a mastic basecoat 24, and (b) a thermoplastic topcoat 26.

Within the preferred embodiment of the invention, the mastic basecoat 24 is generally applied directly to the substrate 22.

However, within an alternative embodiment of the present invention, a mastic primer 28 is initially applied to the substrate 22, prior to the application of the mastic basecoat 24 and/or the thermoplastic topcoat 26. Within this embodiment, the mastic primer 28 adheres and bonds to the underlying substrate 22. The mastic basecoat 24 then adheres and bonds to the mastic primer 28. In turn, the thermoplastic topcoat 26 then adheres and bonds to the mastic basecoat 24.

Figure 3:
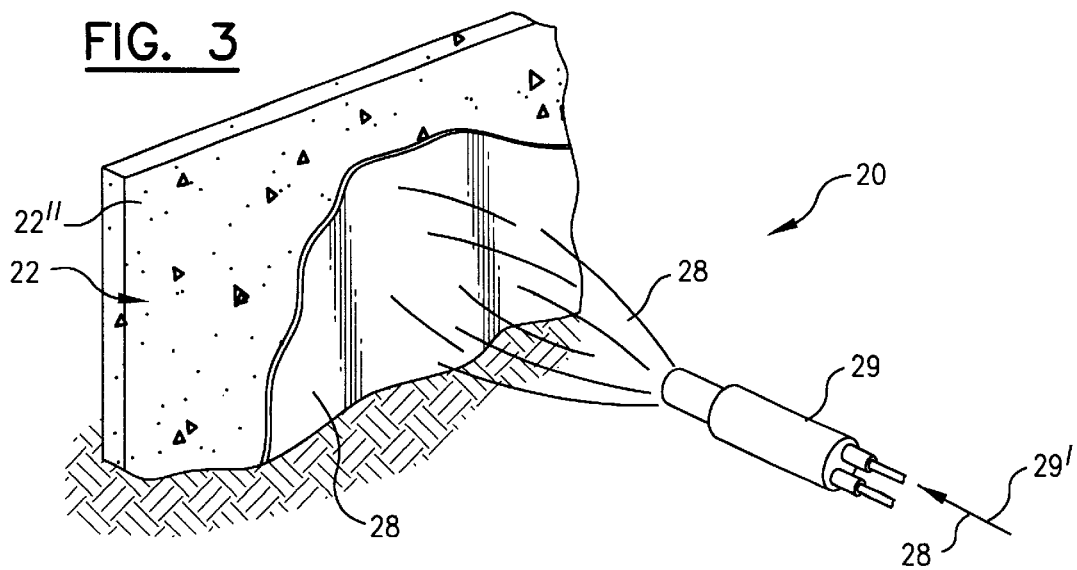
FIG. 3 is a partial, perspective, schematic view of a mastic primer of the present invention being applied to a substrate surface.

The mastic primer 28 may be applied to the substrate 22 in either a molten state or in a generally solvent or solvented state. FIG. 3 illustrates the mastic primer 28 being applied in a molten state to a substrate 22 which generally comprises a flat or planar seawall 22". The molten mastic primer 28 is sprayed upon the substrate 22 by means of a pressurized spray gun 29. Arrow 29' within FIG. 3 indicates the introduction of molten mastic primer 28 into the spray gun 29.

When the mastic primer 28 is not used, the mastic basecoat 24 would directly adhere and bond to the substrate 22.

The attached Figures may be used to indicate both alternative embodiments, as discussed above. More particularly, the illustrations include the mastic primer 28 actually applied to the substrate 22. However, if the mastic primer 28 is not used, please simply disregard the illustrated layer of mastic primer 28 and consider the mastic basecoat 24 as being directly applied to the substrate 22.

Furthermore, please note that as used within the appended claim language, the phrase "a mastic basecoat generally applied to the substrate" includes application of the mastic basecoat 24 either directly to the underlying substrate 22 and/or to the mastic primer 28 which is applied to the underlying substrate 22, when the mastic primer 28 is used.

Figure 4:
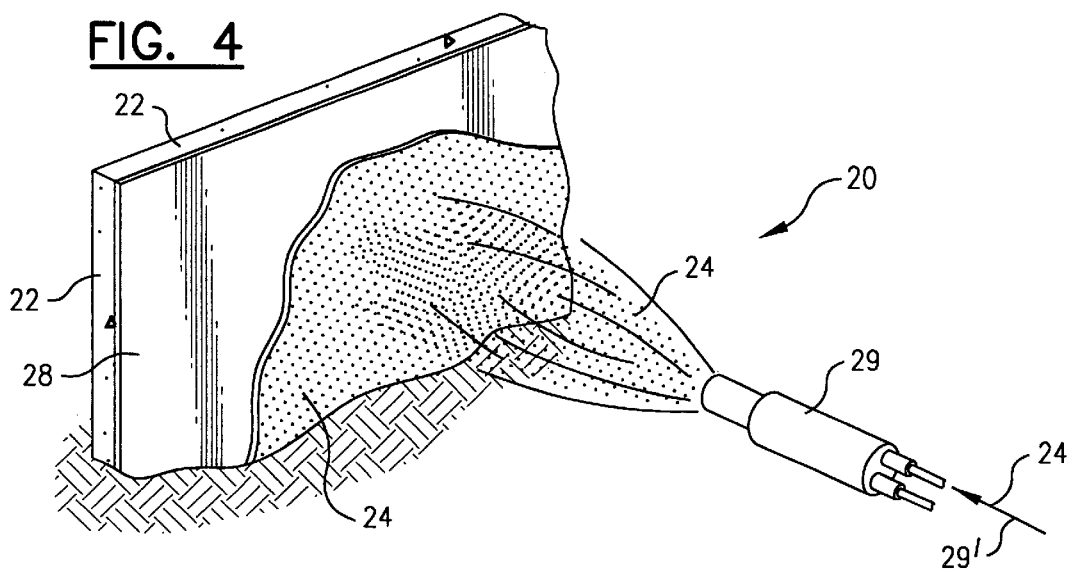
FIG. 4 is a partial, perspective, schematic view of a mastic basecoat being applied directly to a substrate surface, or, alternatively, to a substrate surface that was previously treated with a mastic primer as taught herein.

Within the preferred embodiment of the invention, the mastic basecoat 24 generally comprises a polymer-modified asphaltic material, such as a product currently sold within the marketplace under the trademark or trade name CRAFCO 561. As shown in FIG. 4, the mastic basecoat 24 can be applied to the substrate 22 in a molten state. The molten mastic basecoat 24 is sprayed upon the substrate 22 and/or mastic primer 28 by means of a pressurized spray gun 29. Arrow 29' within FIG. 4 indicates the introduction of molten mastic basecoat 24 into the spray gun 29.

Alternatively, the mastic basecoat 24 can be applied to the substrate 22 in a generally solvent or solvented state. This permits the mastic basecoat 24 to be applied to the substrate 22 using a hand trowel.

When applied, the mastic basecoat 24 is usually built up to a thickness of about 70 mils to 80 mils.

As illustrated in FIGS. 5 and 6, the thermoplastic topcoat 26 is applied to the substrate 22 over the mastic basecoat 24.

In essence, the mastic basecoat 24 functions as a foundation for the thermoplastic topcoat 26, permitting enhanced adhesion for the thermoplastic topcoat 26 to the underlying substrate 22. The thermoplastic topcoat 26 is usually built up to a thickness of about 10 mils to 30 mils.

Since the thermoplastic topcoat 22 is applied using a flame-spraying process, or using a molten spraying process, the thermoplastic topcoat 22 at least partially melts and integrates into the mastic basecoat 24.

The flame-spraying process is illustrated within FIG. 5, wherein the pelletized and/or powdered thermoplastic topcoat 26 is sprayed upon the mastic basecoat 24 by means of a pressurized spray gun 29. Arrow 29' within FIG. 5 indicates the introduction of powdered thermoplastic topcoat 24 material into the spray gun 29.

Arrow 29" within FIG. 5 indicates the introduction of pressurized propane, butane or other flammable gas into the spray gun 29. Upon leaving the nozzle of the spray gun, the propane, butane or other flammable gas is ignited to generate a flame 32. The heat from the flame 32 melts the pelletized and/or powdered thermoplastic topcoat 26 material into a molten state which is sprayed onto and into the mastic basecoat 24.

FIG. 6 illustrates the apparatus 20 fully applied to the substrate 22.

Within another alternative embodiment of the invention, and as shown within FIG. 6, an abrasion resistant material 30, such as beads, metal shavings, pellets, shot, glass, aggregate, granite, gravel, sand, or other like material, may be adhered, pressed, rolled or sprayed into operative engagement with the thermoplastic topcoat 26.

The present invention also includes various methods for manufacturing, applying, and repairing the foregoing apparatus.

Much of the following information may seem to be repetitive of the foregoing material. However, this patent document is a legal document that requires specific treatment of the apparatus and the methods of the present invention.

This invention also includes a method for shielding and protecting the substrate 22 of non-flammable material from corrosion and abrasion. The method generally comprises the steps of: (a) applying the mastic basecoat 24 generally to the substrate 22; and (b) applying the thermoplastic topcoat 26 to the mastic basecoat 24.

For example, the step of applying the mastic basecoat 24 to the substrate 22 may comprise the step of applying the mastic basecoat 24 to a metal, steel, concrete, rock, stone, ceramic or tile substrate. The step of applying the mastic basecoat 24 may include the step of adhering and bonding the mastic basecoat 24 to the substrate 22. Similarly, the step of applying the mastic basecoat 24 may include the step of applying a mastic basecoat 24 of asphaltic material to the substrate 22. The step of applying the mastic basecoat 24 may also include the step of applying the mastic basecoat in a molten state to the substrate 22. Alternatively, the step of applying the mastic basecoat 24 may include the step of applying the mastic basecoat 24 in a generally solvent or solvented state to the substrate 22. The step of applying the mastic basecoat 24 may include the step of applying the mastic basecoat 24 to a thickness of about 70 mils to 80 mils on the substrate. These steps are generally shown within FIG. 4.

With reference to the thermoplastic topcoat 26, it is important to note, that the thermoplastic topcoat 26 should at least partially melt into and/or integrate into the mastic basecoat 24, and thereby become integral therewith. The step of applying the thermoplastic topcoat 26 may include the step of applying the thermoplastic topcoat 26 to a thickness of about 10 mils to 30 mils on the mastic basecoat 24. Please note that these parameters are generally nonspecific because of the integration of the thermoplastic topcoat 26 into the underlying mastic basecoat 24. These steps are generally shown within FIGS. 5 and 6.

The invention may also include additional steps or procedures of applying the mastic primer 28 to the substrate 22 prior to the step of applying the mastic basecoat 24 to the substrate 22. In essence, the mastic primer 28 adheres and bonds to the substrate 22. The mastic basecoat 24 then adheres and bonds to the mastic primer 28. The thermoplastic topcoat 26 subsequently adheres and bonds to the mastic basecoat 24. The step of applying the mastic primer 28 may include the step of applying the mastic primer 28 in a molten state to the substrate 22. Alternatively, the step of applying the mastic primer 28 may include the step of applying the mastic primer 28 in a solvent state or solvented state to the substrate 22. These steps are generally shown within FIG. 3.

An even further alternative embodiment of the present invention may include the step of adhering, pressing, rolling and/or spraying the abrasion resistant material 30 into operative engagement with the thermoplastic topcoat 26. The step of adhering, pressing, rolling or spraying the abrasion resistant material 30 may further include the steps of adhering, pressing, rolling and/or spraying beads, metal shavings, pellets, shot, glass, aggregate, granite, gravel or sand into operative engagement with the thermoplastic topcoat 26. In other words, the abrasion resistant material 30 generally comprises the beads, metal shavings, pellets, shot, glass, aggregate, granite, gravel and/or sand just mentioned. These steps are generally shown within FIG. 6.

The invention may also include the step of applying heat to the substrate 22 to preheat the substrate 22 prior to the step of applying the mastic basecoat 24 and/or mastic primer 28 thereto. It is believed that such a step is so easily understood that a drawing is not needed or required.

For purposes of illustration, and not by way of limitation, the mastic basecoat 24 of the preferred embodiment of the present invention is a polymer modified asphalt having a: (a) tensile adhesion of about 500 psi or greater; (b) flash point of about 500 degrees Fahrenheit; (c) thermal viscosity of about 700 to 1300 centipoises; and (d) elongation of about 500 percent or more; and ductility of about 50 centimeters per minute. For example, the mastic basecoat 24 may comprise an asphalt known as CAS 8052-42-4. Such asphaltic mastic material is modified and polymerized into an asphalt base because is it extremely inexpensive to do so. The mastic basecoat 24 starts off in a solidified form, is heated to about 350 or 450 degrees Fahrenheit and turned fluid. The mastic basecoat 24 is then applied in its molten form to the substrate 22. The molten mastic basecoat 24 permeates the substrate 22, even when the substrate 22 is only minimally prepared. Once the mastic basecoat 24 cools, it solidifies to provide a very nice solidified, elastomeric, flexible and very well adhered coating. In addition, when the mastic basecoat 24 material is heated to its molten state, the mastic experiences an extremely aggressive adhesion. The mastic will stick to nearly everything.

For purposes of illustration, and not by way of limitation, the thermoplastic topcoat 26 of the preferred embodiment of the present invention has a: (a) density of about 0.918 grams per cubic centimeter; (b) tensile strength of about 10.3 Mpa or about 1500 psi; (c) elongation of about 500 percent or more; (d) flexural modulas of about 64.8 Mpa or about 9400 psi at 73 degrees Fahrenheit; (e) hardness of about 42 Shore D; (f) tensile impact strength of about 413 KJ per square meter or about 196 foot-pounds per square inch at 73 degrees Fahrenheit, and about 55 KJ per square meter or about 26 foot-pounds per square inch at negative 40 degrees Fahrenheit; (g) QUV of no general discoloration or chalking for 2000 hours or longer; (h) dielectric breakdown factor of 893 plus or minus 163 volts per mils.; (i) volume resistivity of about 4.67 times 10 to the 13th power insulator ohms per centimeter; (j) impact resistance of 384 inch-pounds on direct impact; (k) melting point of about 176 to 221 degrees Fahrenheit or about 80 to 105 degrees Celsius; and (l) specific gravity of greater than 0.93. For example, the thermoplastic topcoat 26 may comprise the combination of: ethylene methacrylic acid polymer known as CAS# 25053-53-6; and a haze gray pigment. This thermoplastic topcoat 26 can be flame-sprayed by taking the plastic powder, suspending it in a fluidized bed, pressurizing it, and shooting it through a nozzle of flame which melts it and atomizes it at the same time. The flame-sprayer or spreader is used to apply the thermoplastic topcoat 26 onto the basecoat 24.

For purposes of illustration, and not by way of limitation, the mastic primer 28 of the preferred embodiment of the present invention may comprise MV&P Naphtha, or Toluene known as CAS# 108-88-3. Such insoluble mastic primer 28 material has a: (a) boiling point of about 232 degrees Fahrenheit; (b) volatility of about 60 percent by weight; (c) vapor pressure of about 22 mmHg at about 20 degrees Celsius; (d) specific gravity of 0.87; (e) odor threshold of about 10 to 15 ppm.; (f) flash point at 40 degrees Fahrenheit or 4 degrees Celsius; (g) vapor density of about 3.2; (h) evaporation rate of about 2.24; and (h) octanol/water partition coefficient of about 2.69.

The means and construction disclosed herein are by way of example and comprise primarily the preferred and several alternative forms of putting the invention into effect. Although the drawings depict preferred and alternative embodiments of the invention, other embodiments are described within the preceding and following text. One skilled in the art will appreciate that the disclosed apparatus and devices may have a wide variety of different shapes, configurations, thicknesses and applications. Additionally, persons skilled in the art to which the invention pertains might consider the foregoing teachings in making various modifications, other embodiments, and alternative forms of the invention.

It is, therefore, to be understood that this invention is not limited to the particular embodiments or specific features shown herein. To the contrary, the inventor claims the invention in all of its various forms, including all alternatives, modifications, equivalents and alternative embodiments that fall within the legitimate and valid scope of the claims, appropriately interpreted under the Doctrine of Equivalents.

INDUSTRIAL APPLICABILITY

The present invention may be used in any industry, occupation and/or sport that could benefit from using simple, reliable, easily applied apparatus and methods for protecting, maintaining, repairing, refinishing, refurbishing and/or replacing a substrate that is exposed to corrosion, abrasion, toxic contamination and/or radioactive contamination.

The present invention can be applied to a wide variety of different substrates. For example, this invention could be applied to a substrate comprising metal, steel, concrete, rock, stone, ceramic material, tile, or nearly any other material that is generally non-flammable.

The present invention is primarily intended to be used to protect saltwater, waste water, atmospheric and other corrosion resistant barriers, toxic contamination barriers, and radioactive contamination containment barriers. For example, this invention can be used to treat and repair various substrates wherein their previously applied anticorrosion barriers have failed, particularly barriers having a thermoset coating. Consequently, this invention has particular applicability to the marine industry for use on steel seawalls and within the sewer line industry for concrete and/or ceramic sewer lines.

In other words, the substrates for which the present invention is primarily intended to protect include concrete and/or steel structures that are subject to corrosive environments that are above what would normally be considered common environmental conditions, such as inclement weather. Such structures would include, but are not limited to, bridges, seawalls, and dry dock structures.

Other applications for the apparatus of this invention can be easily found. For example, the present invention could be applied to the hull or bottom of drift boats, boats, yachts, ships, barges, freighters, industrial transportation vehicles, trucks, and the like. It is anticipated that the application of this invention should not appreciably increase the weight of the object protected.

The present invention could also be used to line cooling ponds and other structures at nuclear power plant facility.

I claim:

1. A field applied apparatus for shielding and protecting a substrate of substantially non-flammable material from corrosion or abrasion, said apparatus comprising combination of:
    (a) a polymer modified thermoplastic basecoat applied to the substrate, said basecoat changing to a fluid, semi-fluid or molten state when heated, said basecoat adhering or bonding to the substrate when applied to the substrate; and
    (b) a thermoplastic topcoat applied to said basecoat, said topcoat at least partially melting and integrating into said basecoat, said basecoat and said topcoat defining separate thermoplastic polymers, said basecoat forming a substantially stable anticorrosive foundation, adhesive or sealant for said topcoat, said topcoat forming an integrally bonded layer over said basecoat, said topcoat protecting said basecoat from mechanical, chemical or ultraviolet attack.

2. The apparatus of claim 1, wherein said basecoat becomes fluid, semi-fluid or molten at about 350 degrees Fahrenheit to 500 degrees Fahrenheit, said basecoat having compatible thermoplastic properties with said topcoat.

3. The apparatus of claim 1, wherein said basecoat is applied to the substrate in a molten state.

4. The apparatus of claim 1, further comprising a solvent mixed with said basecoat to increase viscosity, said solvent and said basecoat applied to said substrate.

5. The apparatus of claim 1, wherein said basecoat comprises a thickness of about 70 mils to 80 mils.

6. The apparatus of claim 1, wherein said topcoat comprises a thickness of about 10 mils to 30 mils.

7. The apparatus of claim 1, wherein the substrate is metal, steel, concrete, rock, stone, ceramic or tile.

8. The apparatus of claim 1, further comprising a primer applied to the substrate, said primer adhering or bonding to the substrate, said basecoat adhering or bonding to said primer.

9. The apparatus of claim 8, further comprising a solvent mixed with said basecoat to increase viscosity, said solvent and said basecoat applied to said substrate.

10. The apparatus of claim 1, further comprising an abrasion resistant material that is adhered, pressed, rolled or sprayed into operative engagement with said topcoat.

11. The apparatus of claim 10, wherein said abrasion resistant material comprises beads, metal shavings, pellets, shot, glass, aggregate, granite, gravel or sand.

12. An apparatus for shielding and protecting a substrate of non-flammable material from corrosion and abrasion, said apparatus comprising combination of:
    (a) polymer modified thermoplastic basecoat applied to the substrate, said basecoat changing to a fluid, semi-fluid or molten state when heated, said basecoat adhering or bonding to the substrate when applied to the substrate; and
    (b) a thermoplastic topcoat applied to said basecoat, said topcoat at least partially melting and integrating into said basecoat, said basecoat comprising an asphaltic material.

13. A field applied method for shielding and protecting a substrate of substantially non-flammable material from corrosion or abrasion, said method comprising steps of:
    (a) applying a polymer modified thermoplastic basecoat to the substrate, the basecoat changing to a fluid, semi-fluid or molten state when heated, the basecoat adhering or bonding to the substrate when applied to the substrate; and
    (b) applying a thermoplastic topcoat to the basecoat, the topcoat at least partially melting and integrating into the basecoat, the basecoat and the topcoat defining separate thermoplastic polymers, the basecoat forming a substantially stable anticorrosive foundation, adhesive or sealant for the topcoat, the topcoat forming an integrally bonded layer over the basecoat, the topcoat protecting the basecoat from mechanical, chemical or ultraviolet attack.

14. The method of claim 13, wherein said step of applying the basecoat further comprises a step of heating the basecoat at about 350 degrees Fahrenheit to 500 degrees Fahrenheit such that the basecoat becomes fluid, semi-fluid or molten, the basecoat having compatible thermoplastic properties with the topcoat.

15. The method of claim 13, wherein said step of applying the basecoat comprises a step of applying a basecoat of asphaltic material to the substrate.

16. The method of claim 13, wherein said step of applying the basecoat comprises a step of applying the basecoat in a molten state to the substrate.

17. The method of claim 13, wherein said step of applying the basecoat comprises a step of mixing a solvent with the basecoat to increase viscosity, and a step of applying the solvent and the basecoat to the substrate.

18. The method of claim 13, wherein said step of applying the basecoat comprises a step of applying the basecoat to a thickness of about 70 mils to 80 mils on the substrate.

19. The method of claim 13, wherein said step of applying the topcoat comprises a step of applying the topcoat to a thickness of about 10 mils to 30 mils on the basecoat.

20. The method of claim 13, wherein said step of applying the basecoat to the substrate comprises a step of applying the basecoat to a metal, steel, concrete, rock, stone, ceramic or tile substrate.

21. The method of claim 13, further comprising a step of applying a primer to the substrate prior to said step of applying the basecoat to the substrate, the primer adhering or bonding to the substrate, the basecoat adhering or bonding to the primer.

22. The method of claim 13, further comprising a step of adhering, pressing, rolling or spraying an abrasion resistant material into operative engagement with the topcoat.

23. The method of claim 22, wherein said step of adhering, pressing, rolling or spraying the abrasion resistant material comprises a step of adhering, pressing, rolling or spraying beads, metal shavings, pellets, shot, glass, aggregate, granite, gravel or sand into operative engagement with the topcoat.

24. The method of claim 13, further comprising a step of applying heat to the substrate prior to said step of applying the basecoat.

\* \* \* \* \*